H. E. MERWIN.
COLOR SCREEN.
APPLICATION FILED MAR. 23, 1910.

977,420.

Patented Nov. 29, 1910.

Witnesses
C. H. Walker
James D. Mansfield

Inventor
Herbert E. Merwin.
By Alexander & Dowell
Attorneys

UNITED STATES PATENT OFFICE.

HERBERT E. MERWIN, OF HENSONVILLE, NEW YORK.

COLOR-SCREEN.

977,420.  Specification of Letters Patent.  Patented Nov. 29, 1910.

Application filed March 23, 1910. Serial No. 551,127.

*To all whom it may concern:*

Be it known that I, HERBERT E. MERWIN, of Hensonville, in the county of Greene and State of New York, have invented certain new and useful Improvements in Color-Screens; and I hereby declare that the following is a full, clear, and exact description thereof, reference being had to the accompanying drawings, which form part of this specification.

This invention is a "color screen" to be used for detecting and determining whether certain chemical elements or compounds are contained in various substances, by noting the effect that such chemical substances have on the color of a flame—(usually that of a Bunsen burner)—as seen through the screen when such a substance is introduced into such flame and burned or heated thereby.

The screen consists essentially of three parallel differently-colored bars or strips of transparent or translucent material, (preferably celluloid), one of which bars has an absorption spectrum like methyl violet; another like anilin blue; and the third bar combines both the blue and the violet. The screen is preferably formed of two sheets of transparent celluloid which are partially overlapped, and one sheet is stained with organic dyes so as to give an absorption spectrum like methyl violet and the other stained to give an absorption spectrum like anilin blue, the outer portion of each sheet forms one bar of the screen and the overlapped portion of the two sheets forms the third bar of the screen and combines the two colors. Such a screen will absorb the orange and yellow of the spectrum; the blue bar of the screen absorbs strongly from about 23 (in the spectrum scale having D at 50) to 60; that is, including the orange-red, the orange and half the yellow; the violet bar of such screen absorbs strongly from about 33 to 70; that is, the orange and the yellow; the sodium line at 50 is therefore absorbed by both bars. Thus in the presence of sodium the red, green and blue colors imparted to the flame by certain elements and compounds may be readily detected by means of the screen. Certain colors transmitted by one bar are absorbed by the central bar of the screen.

Figure 1:
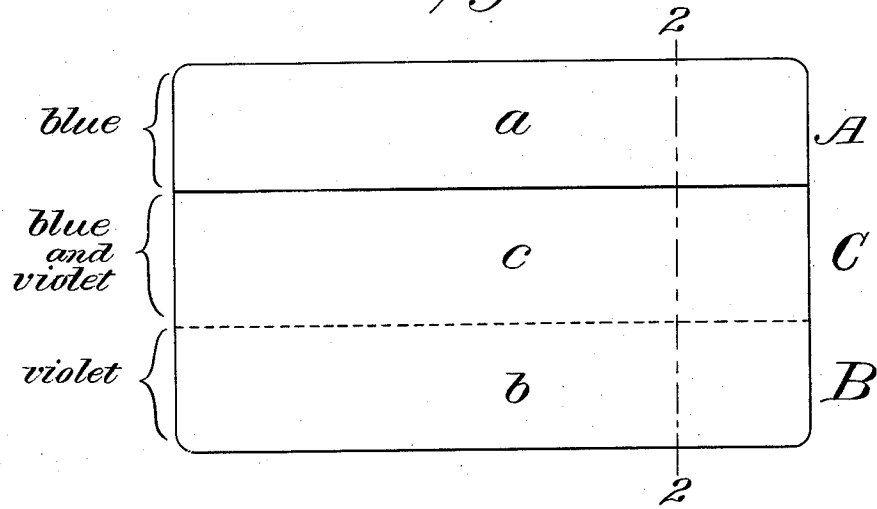
Figure 2:

In the accompanying drawings—Figure 1 illustrates the preferred construction of such a screen; and Fig. 2 is an enlarged section thereof on line 2—2, Fig. 1.

The screen, as shown in Figs. 1 and 2, consists of a sheet A, of transparent material, preferably celluloid, stained blue, and a sheet B of like material stained violet, and these sheets are overlapped longitudinally, as at C, so that the complete screen presents a longitudinal bar $a$ of blue; a similar bar $b$ of violet, and an intermediate bar $c$ which combines both the blue and violet. The sheets A and B may be secured together in any suitable manner, so that the screen can be handled as a unit. If the sheets are of celluloid I preferably use a cement formed by dissolving celluloid in a suitable solvent, as such cement will not affect the colors of the screen. While I prefer to use celluloid, other solid transparent material stained and overlapped as shown can be used; but it is practically impossible to produce the desired colors in glass, because suitable coloring matters will decompose at the temperature required to make glass.

The essential feature of the screen consists in sheets of suitable translucent or transparent material stained as described, with organic tints or colors, so as to give three distinct bars each having a deep absorption spectrum.

A screen about 3 x 5 inches in size and having three colored bars, one blue, one violet, and one combining the blue and violet, is best suitable for general laboratory use. Such a screen can be conveniently handled and is a most delicate but certain means of identifying the chemical elements usually sought by means of the spectroscope, and its use greatly facilitates the work of laboratory instruction in qualitative analysis and mineralogy.

In obtaining flame reactions from non-volatile compounds some flux or acid should be used that will produce a volatile compound of the element sought. For example a silicate containing potassium may be powdered, and decomposed in a sodium carbonate bead on a platinum wire; the resulting potassium carbonate is volatile. The phosphate minerals, apatite, lazulite and wavellite, give the phosphoric acid reaction readily if powdered, taken up on a moistened loop of platinum wire, heated and then treated with concentrated sulfuric acid and again heated. The reaction is transient.

Viewed through the screen, strontium and lithium flames appear deep red through the violet bar, but give no color through the blue bar. Barium and boron give a vivid green through the blue bar, and only a faint green through the violet bar. Volatile calcium salts impart a strong greenish-yellow color to the flame as seen through the blue bar, but through the violet bar the color appears a pale red. Through the combination-bar the flame has a tinge of green. The color flashes out only at the moment when the salt is becoming incandescent. Potassium seen through the blue bar has an intense blue-violet color; through the violet bar the outside of the Bunsen flame is violet and the inside violet-red; through the combination-bar the flame appears as through the violet screen, but less bright, and with red predominating. These colors are very characteristic. The copper chlorid flame appears bright blue fringed with green through the violet bar; brilliant green through the blue bar, and a paler green through the combination-bar. The flame color of phosphoric acid is green through the blue bar, light rose color (violet-red) through the violet bar and pale green through the combination-bar.

In case lithium light free from sodium light is wanted for use in optical mineralogy the violet bar is a very serviceable filter.

What I claim is:

1. A color screen comprising two sheets of suitable material, and of different organic color, overlapped to form an intermediate bar containing both colors; substantially as set forth.

2. A color screen for the purpose specified comprising two sheets of suitable material, one violet and the other blue overlapped to form an intermediate bar combining both colors; substantially as described.

3. A flame color screen formed of two transparent celluloid sheets, one stained methyl violet and the other anilin blue, said sheets being partially overlapped to form a bar containing both colors; substantially as and for the purpose set forth.

In testimony that I claim the foregoing as my own, I affix my signature in presence of two witnesses.

H. E. MERWIN.

Witnesses:
G. A. RANKIN,
FRED E. WRIGHT.